6694 x
S. White.
Clover Huller.
Patented Aug 10, 1831.
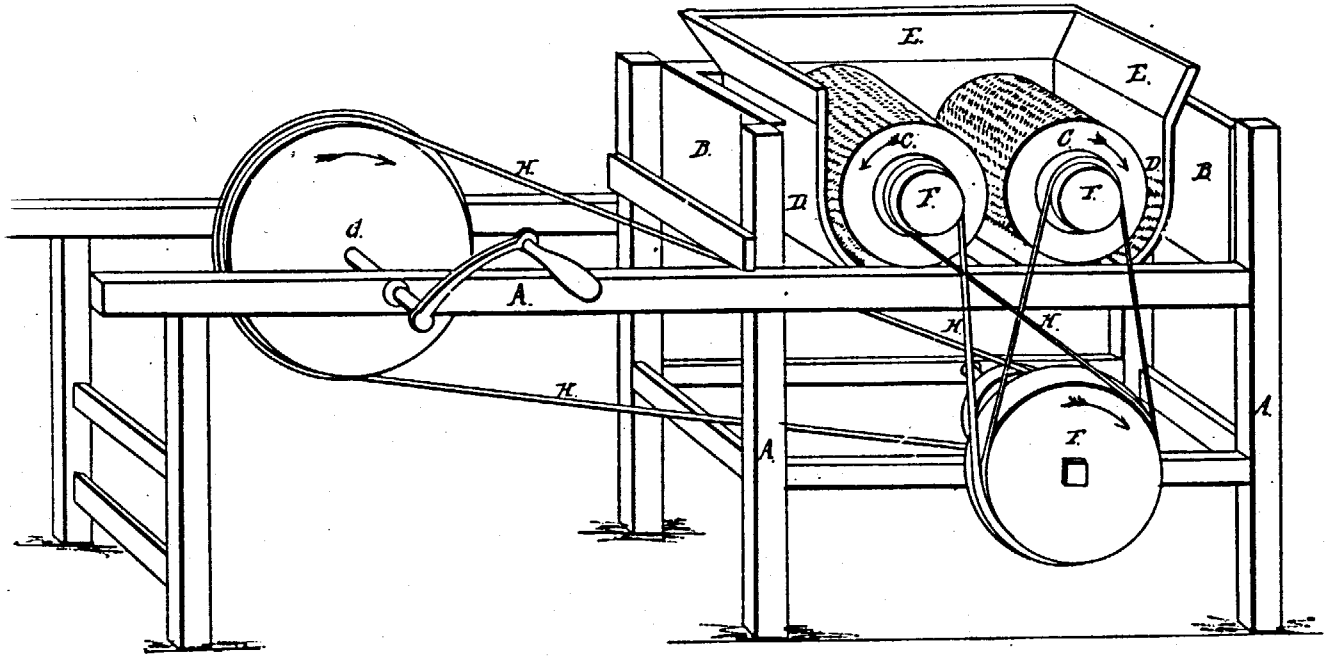

X0006694 Aug 10, 1831

Samuel White Adams County Pennsylvania.

Letters Patent.

The schedule referred to in these Letters Patent and making part of the
same Containing a description in the words of the said Samuel White him
self of his Improvement in the machine for hulling and cleaning Clover seed.

To all to whom these presents shall come be it known that I Samuel White
of Adams County in the State of Pennsylvania have invented or discovered
a new and useful improvement in the machine for hulling and clean
ing Clover seed and that the following is a full and exact descrip
tion of the construction and operation of the same, as invented or im
proved by me, to wit There will be a frame constructed in any Convenient
manner the upper part of which will be enclosed or boarded up on the sides
and ends so that it will form a box or curb open at top and bottom.
There will be two revolving Cylin
ders of any Convenient length and diameter fixed on axles placed across
the middle of the frame or Curb. Immediately back of said Cylinders
at each end of said frame or Curb there will be concaves, one affixing
within each end of said frame of such curve as will fit to the sides
of the Cylinders. The Cylinders and Concaves may be made of cast iron, or
other metals or of wood coated over with emery or fixed with slats or iron
points or teeth, or the Cylinders and Concaves may be covered with sheet
cards so fixed that the teeth shall point with the motion of the Cylinders that
is so that when the Cylinders are in motion the card teeth shall move
point foremost and the teeth on the Concaves shall point in the same
direction as the teeth on the Cylinders where they are in contact with the
Concaves. There will be a hopper fixed to contain the clover heads or
hulls immediately over the cylinders. There may be a riddle or riddles and
a fan under the machine (moved by the same power which which turns
the Cylinders) with which the seed may be cleaned at the same time
that it is hulled. If preferred the machine may be made without said riddle and fan, and the seed cleaned in a separate machine.

The machine may be moved by hand or water horse, or other power may be employed. The power may be communicated to the machine in any convenient manner so that it shall cause the cylinders to revolve in opposite directions — that is — so that the motion of the cylinders shall be <u>from</u> each other on the top or upper side and down on the outside by the concaves.

One of the various plans by which motion can be communicated to the machine is to have a shaft made to which the moving power is applied placed across the machine under the cylinders which said shaft may be connected with the cylinders by means of pulleys and bands or straps — or by wheels and pinions so geared as to give the requisite motion to the cylinders.

The concaves (placed as before mentioned across the ends of the machine by the sides of the cylinders) will be so arranged with screws wedges and other fixtures that they may be placed and held in any position near to, in contact with or a little distance from said cylinders. The part believed to be new and claimed as an invention or discovery is the use of two cylinders and two concaves geared in the manner above mentioned so as to turn from each other on the top — and the plan of placing the cards as above described, the teeth on the concave and cylinder pointing in the same direction and also the plan of coating the cylinders and concaves with carding as above mentioned.

Saml White

Exd. MGC
Witnesses
D. B. Lee
Thos Nicholson
Jacob Redifer drawing in Port folio

[illegible] 42 ND